United States Patent
Staubach et al.

(10) Patent No.: US 11,859,910 B2
(45) Date of Patent: Jan. 2, 2024

(54) HEAT EXCHANGER TUBE SUPPORT

(71) Applicant: Raytheon Technologies Corporation, Farmington, CT (US)

(72) Inventors: Joseph B. Staubach, Colchester, CT (US); Marc J. Muldoon, Marlborough, CT (US); James F. Wiedenhoefer, Windsor, CT (US)

(73) Assignee: RTX Corporation, Farmington, CT (US)

( * ) Notice: Subject to any disclaimer, the term of this patent is extended or adjusted under 35 U.S.C. 154(b) by 151 days.

(21) Appl. No.: 17/320,853

(22) Filed: May 14, 2021

(65) Prior Publication Data
US 2022/0364504 A1 Nov. 17, 2022

(51) Int. Cl.
| | | |
|---|---|---|
| F28F 9/013 | (2006.01) | |
| F28D 1/047 | (2006.01) | |
| F02C 1/04 | (2006.01) | |
| F28F 1/02 | (2006.01) | |
| F28F 9/02 | (2006.01) | |
| F28D 1/02 | (2006.01) | |
| F28D 21/00 | (2006.01) | |

(52) U.S. Cl.
CPC .............. F28D 1/0475 (2013.01); F02C 1/04 (2013.01); F28F 1/025 (2013.01); F28F 9/013 (2013.01); F28F 9/0131 (2013.01); F28F 9/0221 (2013.01); *F05D 2220/32* (2013.01); *F05D 2260/20* (2013.01); *F28D 2001/028* (2013.01); *F28D 2001/0273* (2013.01); *F28D 2021/004* (2013.01); *F28D 2021/0026* (2013.01)

(58) Field of Classification Search
CPC ........ F28F 9/013; F28F 9/0132; F28F 9/0137; F28F 9/0221; F28F 2240/00; F28D 7/06
See application file for complete search history.

(56) References Cited

U.S. PATENT DOCUMENTS

| 1,817,948 A | 8/1931 | Smith | |
|---|---|---|---|
| 2,090,345 A * | 8/1937 | Coy | F28F 9/0132 165/162 |

(Continued)

FOREIGN PATENT DOCUMENTS

| CA | 2780374 | 12/2012 |
|---|---|---|
| CN | 113432475 A | 9/2021 |

(Continued)

OTHER PUBLICATIONS

R.S. Nelson et al., "Creep Fatigue Life Prediction for Engine Hot Section Materials (Isotropic)", NASA Contractor Report 189220, Aug. 1992, National Aeronautics and Space Administration, Washington, D.C.

(Continued)

*Primary Examiner* — Eric S Ruppert
(74) *Attorney, Agent, or Firm* — Bachman & LaPointe, P.C.

(57) ABSTRACT

A heat exchanger for heat exchange between a first fluid and a second fluid has a plurality of tube sections, each having: an interior for passing the first fluid; an exterior for exposure to the second fluid; a first leg; a second leg; and a turn joining the first leg to the second leg. A has: fiber members passing between legs of the tube sections; and an end plate.

20 Claims, 12 Drawing Sheets

(56) References Cited

U.S. PATENT DOCUMENTS

| | | | |
|---|---|---|---|
| 2,143,157 A * | 1/1939 | Kotzebue | F28D 7/1638 |
| | | | 165/95 |
| 2,278,086 A | 3/1942 | Lea | |
| 3,055,349 A | 9/1962 | Hamilton et al. | |
| 3,804,648 A | 4/1974 | Birchall et al. | |
| 3,893,507 A * | 7/1975 | MacCracken | F25C 3/02 |
| | | | 62/235 |
| 4,031,862 A | 6/1977 | Smith | |
| 4,056,143 A | 11/1977 | Martin | |
| 4,577,684 A | 3/1986 | Hagemeister | |
| 4,595,161 A | 6/1986 | Williams | |
| 4,597,436 A | 7/1986 | Hagemeister et al. | |
| 4,698,888 A * | 10/1987 | Hagemeister | F28F 9/0221 |
| | | | 29/890.052 |
| 4,800,955 A | 1/1989 | Hagemeister et al. | |
| 4,893,674 A | 1/1990 | Hagemeister | |
| 5,020,587 A | 6/1991 | Mongia et al. | |
| 5,033,542 A * | 7/1991 | Jabs | F28D 7/06 |
| | | | 165/DIG. 426 |
| 5,213,155 A * | 5/1993 | Hahn | F28F 9/0132 |
| | | | 248/68.1 |
| 5,267,608 A | 12/1993 | Coffinberry | |
| 5,318,110 A | 6/1994 | Wei | |
| 9,921,002 B2 | 3/2018 | Suzuki et al. | |
| 10,184,400 B2 | 1/2019 | Cerny et al. | |
| 10,190,828 B2 | 1/2019 | Rhoden et al. | |
| 11,454,451 B2 | 9/2022 | Wiedenhoefer | |
| 2009/0173072 A1 | 7/2009 | Mastronarde | |
| 2010/0269881 A1 | 10/2010 | Scheller | |
| 2011/0256417 A1 | 10/2011 | Cheruvu et al. | |
| 2015/0101334 A1 | 4/2015 | Bond et al. | |
| 2016/0245125 A1 | 8/2016 | Watkins | |
| 2017/0044983 A1 | 2/2017 | Duesler et al. | |
| 2017/0306794 A1 | 10/2017 | Schwarz et al. | |
| 2018/0334959 A1 | 11/2018 | Jagtap | |
| 2019/0170445 A1 | 6/2019 | McCaffrey | |
| 2019/0170455 A1 | 6/2019 | McCaffrey | |
| 2019/0212074 A1 | 7/2019 | Lockwood et al. | |
| 2020/0224589 A1 | 7/2020 | McAuliffe et al. | |
| 2022/0364802 A1 | 11/2022 | Staubach et al. | |

FOREIGN PATENT DOCUMENTS

| | | |
|---|---|---|
| DE | 2720078 A1 | 11/1978 |
| EP | 0203213 A1 | 12/1986 |
| EP | 3139025 A2 | 3/2017 |
| JP | H05340685 * | 12/1993 |
| WO | 2007/131475 A1 | 11/2007 |
| WO | 2015/149124 A1 | 10/2015 |
| WO | 2020021684 A1 | 1/2020 |

OTHER PUBLICATIONS

"Graphite Properties and Characteristics", Apr. 24, 2020, Entegris, Inc., Billerica, Massachusetts.

European Search Report dated Oct. 13, 2022 for European Patent Application No. 22173608.5.

Office Action dated Dec. 20, 2022 for U.S. Appl. No. 17/320,817.

U.S. Office Action dated Jun. 16, 2023 for U.S. Appl. No. 17/320,817.

* cited by examiner

HEAT EXCHANGER TUBE SUPPORT

BACKGROUND

The disclosure relates to gas turbine engines. More particularly, the disclosure relates to gas turbine engine heat exchangers.

Gas turbine engines (used in propulsion and power applications and broadly inclusive of turbojets, turboprops, turbofans, turboshafts, industrial gas turbines, and the like) include a variety of heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An example positioning of such a heat exchanger provides for the transfer heat from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

Among recently proposed annular heat exchangers are those in United States Patent Application Publication 20150101334A1 (the '334 publication), Bond et al., Apr. 16, 2015, "HEAT EXCHANGERS" and U.S. Pat. No. 10,184,400 (the '400 patent), Cerny et al., Jan. 22, 2019, "Methods of cooling a fluid using an annular heat exchanger".

SUMMARY

One aspect of the disclosure involves a heat exchanger for heat exchange between a first fluid and a second fluid and comprising: a plurality of tube sections. Each tube section has: an interior for passing the first fluid; an exterior for exposure to the second fluid; a first leg; a second leg; and a turn joining the first leg to the second leg. A support has: fiber members passing between legs of the tube sections; and an end plate.

In a further embodiment of any of the foregoing embodiments, additionally and/or alternatively, the fiber members comprise glass fibers.

In a further embodiment of any of the foregoing embodiments, additionally and/or alternatively, the fiber members comprise woven fiber tape.

In a further embodiment of any of the foregoing embodiments, additionally and/or alternatively, for each stage of a plurality of stages of the tubes, the fiber members comprise: a first fiber member between alternate legs of the tube sections; and a second fiber member between alternate legs of the tube sections and out of phase with the first fiber member.

In a further embodiment of any of the foregoing embodiments, additionally and/or alternatively, the first fiber member and second fiber member comprise woven fiber tape.

In a further embodiment of any of the foregoing embodiments, additionally and/or alternatively, the support further comprises: a further fiber member between the fiber members and the end plate.

In a further embodiment of any of the foregoing embodiments, additionally and/or alternatively, end plate is a first end plate and the support further comprises a second end plate sandwiching the fiber members and plurality of tube sections between the first end plate and the second end plate.

In a further embodiment of any of the foregoing embodiments, additionally and/or alternatively, the support is a first support and the heat exchanger comprises a second support spaced from the first support and comprising: fiber members passing between legs of the tube sections; and an end plate.

In a further embodiment of any of the foregoing embodiments, additionally and/or alternatively, the heat exchanger further comprises means for maintaining a spacing between the first support and the second support.

In a further embodiment of any of the foregoing embodiments, additionally and/or alternatively, the support end plate comprises a metallic body.

In a further embodiment of any of the foregoing embodiments, additionally and/or alternatively, the plurality of tube sections have flattened intermediate portions along their first legs and second legs.

In a further embodiment of any of the foregoing embodiments, additionally and/or alternatively, the heat exchanger further comprises a manifold, wherein the first leg and second leg of each of the tube sections are mounted to the manifold and in communication therewith.

In a further embodiment of any of the foregoing embodiments, additionally and/or alternatively, the manifold comprises a plate stack.

In a further embodiment of any of the foregoing embodiments, additionally and/or alternatively, the plurality of tube sections are positioned in a plurality of stages from upstream to downstream along a flowpath of the second fluid.

In a further embodiment of any of the foregoing embodiments, additionally and/or alternatively, the manifold has a convex outer surface from which the plurality of tube sections extend.

In a further embodiment of any of the foregoing embodiments, additionally and/or alternatively, the plurality of tube sections are positioned in a plurality of stages from upstream to downstream along a flowpath of the second fluid.

In a further embodiment of any of the foregoing embodiments, additionally and/or alternatively, a turbine engine includes the heat exchanger and further comprises a gas path passing gas across exteriors of the plurality of tube sections.

In a further embodiment of any of the foregoing embodiments, additionally and/or alternatively, the turbine engine further comprises: a recuperator including the heat exchanger.

In a further embodiment of any of the foregoing embodiments, additionally and/or alternatively, a method for using the heat exchanger comprises: passing a first fluid flow through interiors of the tube sections and passing a second fluid flow along a second flowpath across exteriors of the tube sections wherein: the passing of the first flow and the second flow thermally expands the length of the tube sections to cause a sliding interaction between the tube sections and the fiber members.

In a further embodiment of any of the foregoing embodiments, additionally and/or alternatively, passing the second flow is passing of combustion gases in a gas turbine engine.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
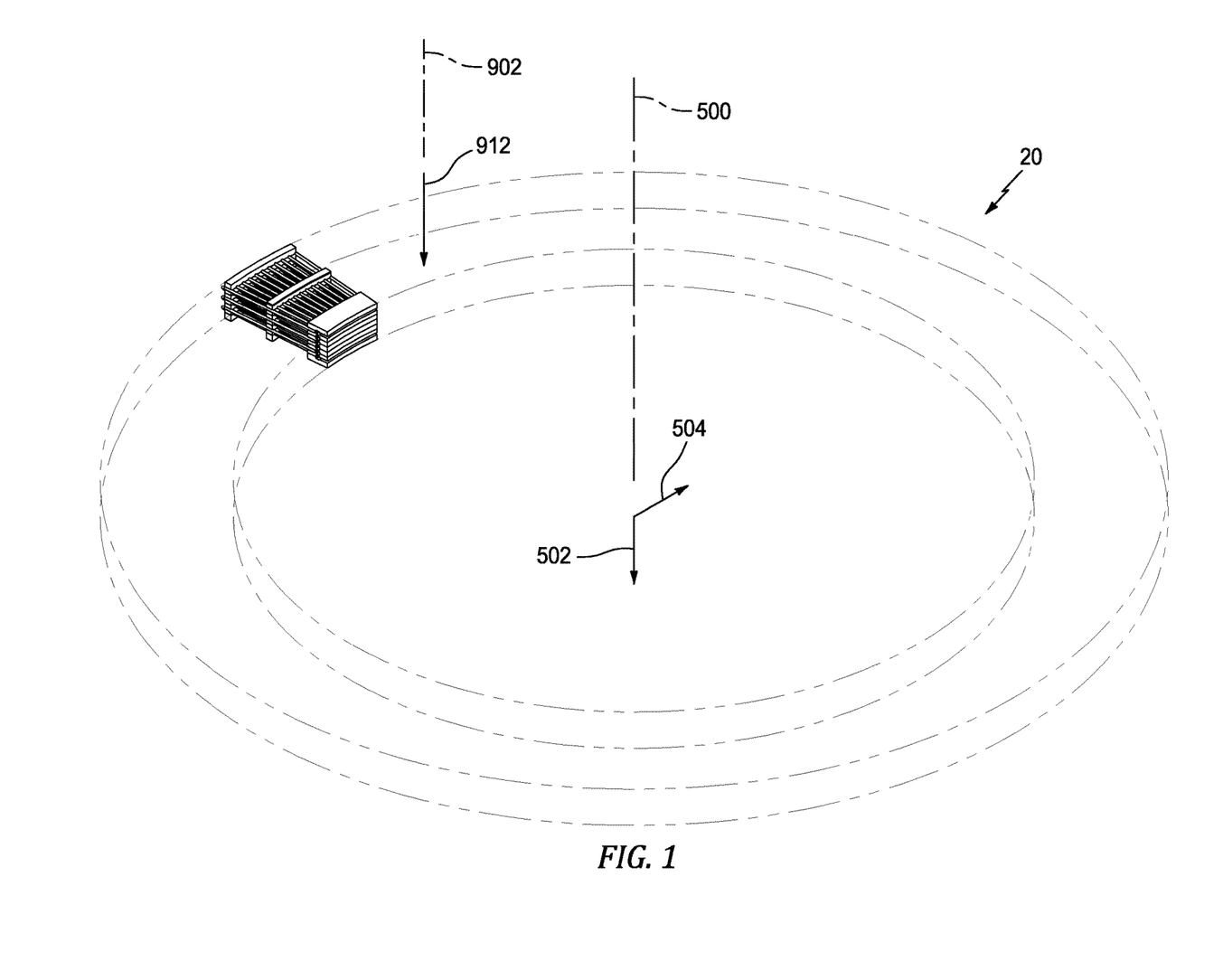
FIG. 1 is a view of an annular heat exchanger with a small sector shown in solid line and the full annular continuation shown in broken line.

FIG. 1 shows a heat exchanger 20 providing heat exchange between a first flowpath 900 (FIG. 1A) and a second flowpath 902 and thus between their respective first and second fluid flows 910 and 912. In the example embodiment, the flowpaths 900, 902 are gas flowpaths passing respective gas flows 910, 912. In the illustrated example, the first flow 910 enters and exits the heat exchanger 20 as a single piped flow and the flow 912 is an axial annular flow surrounding a central longitudinal axis 500 (FIG. 1) of the heat exchanger. FIG. 1 also shows an axial direction 502 as a generally downstream direction along the second flowpath 902. In a coaxial duct within a gas turbine engine, the axis 500 may be coincident with a centerline of the engine and an axis of rotation of its spools, the direction 502 is an aftward/rearward direction, and a radial direction is shown as 504.

The heat exchanger 20 has a first flow inlet 22 (FIG. 1A) and a first flow outlet 24 along the first flowpath 900. The example inlet and outlet are, respectively, ports of an inlet manifold 26 and an outlet manifold 28. Example manifolds are metallic (e.g., nickel-based superalloy). The inlet manifold and outlet manifold may each have a respective fitting 30A, 30B providing the associated port 22, 24. Each manifold 26, 28 further has a body piece 32A, 32B extending circumferentially about the axis 500 from the associated fitting 30A, 30B and port 22, 24. The example manifolds have continuously curving arcuate form.

The example heat exchanger 20 is a continuous full annulus heat exchanger. An alternative but otherwise similar heat exchanger may be circumferentially segmented into a plurality of segments (e.g., four segments or three to eight segments). Each segment may, itself, be identified as a heat exchanger. Depending upon situation, the segments may be plumbed to have respective first flow 910 segments in parallel, in series, or two totally different first flows.

As is discussed further below, the manifolds 26 and 28 are portions of a larger manifold assembly (manifold) 34 which comprises a stack 36 of plates discussed below in addition to the body pieces 32A, 32B.

A plurality of heat transfer tubes 40 each extend between a first end 42 (FIG. 2C) and a second end 44 at ends of respective legs 46 and 48. Portions of the tubes at the ends 42 and 44 are received in the manifold stack 36. The tubes are bent to be generally U-shaped in planform having respective distal turns 49 (FIG. 2B). The example turns are about 180°. Interiors of the tubes fall along the associated branch of the first flowpath 900 to pass an associated portion of the first flow 910. Central exposed exterior surfaces of the tubes are along the second flowpath 902 in heat exchange relation with the second flow 912.

Figure 1A:
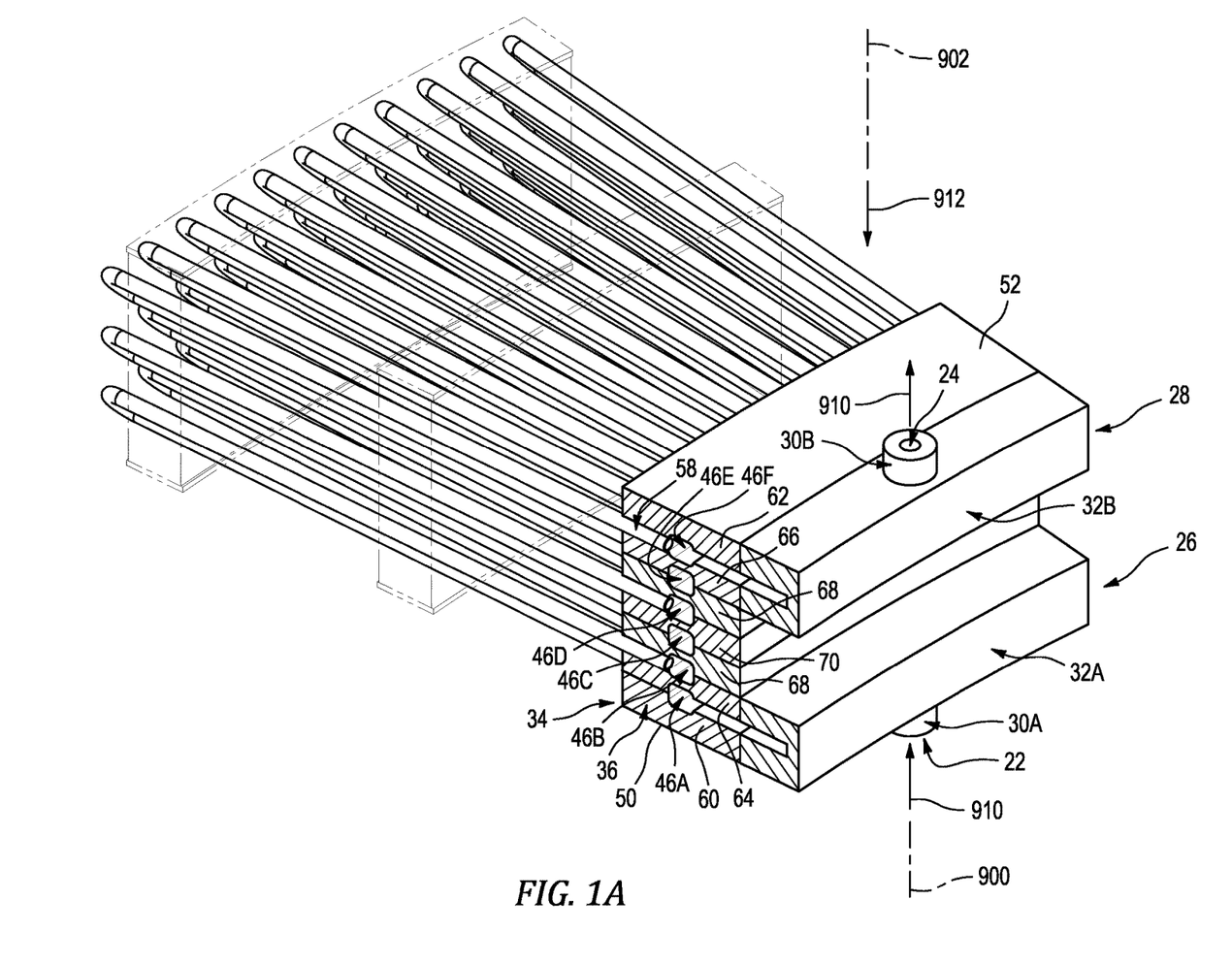
FIG. 1A is a detailed view of the heat exchanger sector of FIG. 1.

In the example implementation, the manifold assembly 34 is a combined inlet, outlet, and transfer manifold including the overall heat exchanger inlet and outlet manifolds 26, 28. The transfer manifold function involves transferring from one stage of tubes to the next. In the FIG. 1A example, there are three stages of tubes. The transfer manifolds (and their associated plenums) thus lack immediate external communication. FIG. 1A shows the inlet manifold 26 having an inlet plenum 46A feeding the first legs 46 of the first stage 40A of tubes. A transfer plenum 46B transfers output of the first stage 40A second legs 48 to a transfer plenum 46C which feeds the first legs of the tubes of the second tube stage 40B. A transfer plenum 46D receives the output of the second stage 40B second legs and passes it to a transfer plenum 46E which feeds the third stage 40C first legs. A discharge plenum 46F of the discharge manifold 28 receives the output of the third stage 40C second legs 48 for discharge from the outlet 24.

As is discussed further below, the stack 36 of plates (FIG. 1A) extends between a first axial end 50 and a second axial end 52. Each of the plates has a pair of opposite faces (axially-facing or radially/circumferentially extending), an inner diameter (ID) surface, and an outer diameter (OD) surface. In the example embodiment, the plates are stacked with the aft (downstream along the example second flowpath 902) face of one plate contacting and secured to the forward/upstream face of the next. From upstream-to-downstream along the second flowpath 902 or fore-to-aft in the axial direction 502, the end sections or portions of groups of the tube legs are mounted in pockets 58 (FIG. 1A) formed between the mating plates.

In the example, the tubes of each stage are circumferentially in phase with the tubes of the other stages. However, other configurations may have the tubes of each stage staggered to relative to the adjacent stage(s) to provide out-of-phase registry with the tubes of the adjacent stage fore or aft (e.g., each tube of a given stage is circumferentially directly between two adjacent tubes of each of the two adjacent stages). In the example, the bent tubes have a first face 54 (FIG. 3) and a second face 56 (e.g., facing toward and away from a viewer when viewing the tube as a "U") with a centerplane 510 parallel to and between the faces. The example plane is at an angle θ relative to a transverse (circumferential in the annular embodiment) direction 506. Example θ (when not 0° of 180°) is about 45°, more broadly 30° to 60°.

FIG. 1A shows pockets 58 at the plate junctions accommodating the tube leg end sections. With example circular-section tubing, the pockets 58 are essentially right circular cylindrical pockets split evenly between the two plates and provided by respective semi-cylindrical grooves 90 (FIG. 4) in the two faces. The grooves (or pocket segments/sections) 90 have surfaces 91 and extend between the associated OD surface 100 of a plate on the one hand and a plenum 46A-F discussed above on the other hand.

With the example arcuate manifold configuration, the tubes in each group circumferentially diverge from each other in the radial direction from the manifold assembly 34. Despite this radial fanning arrangement, each group may be identified as a "row" as is common practice with tube-bank heat exchangers. Depending upon implementation, the two legs of each tube may be parallel to each other with the divergence occurring only between adjacent legs of different tubes or the legs of a given tube may slightly diverge. The former (legs of a given tube parallel to each other) may make assembly easier.

The plates of the stack 36 (FIG. 1A) include a first end plate 60, a second end plate 62, and one or more intermediate plates. Depending on implementation, the intermediate plates may be the same as each other or different from each other. In the illustrated example, the intermediate plates are: first and second penultimate plates 64 and 66 respectively adjacent the first and second end plates 60 and 62; and alternating first intermediate plate(s) 68 and second intermediate plate(s) 70.

For full annular heat exchangers there may be a thousand or more tubes per row. Even for a smaller segment of a circumferentially segmented heat exchanger, there may be hundreds of tubes per row or more in the segment. There may be at least an example twenty in a segment (whether stand-alone or assembled with other segments such as sectors discussed above) or a range of twenty to one thousand or twenty to two hundred). An example number of rows is at least two or at least three. Upper limits may be influenced by diminishing return on heat transfer and by increasing fluidic losses along both flowpaths. Thus, an example upper limit on rows is ten with a likely sweet spot of three to six rows.

Figure 4:
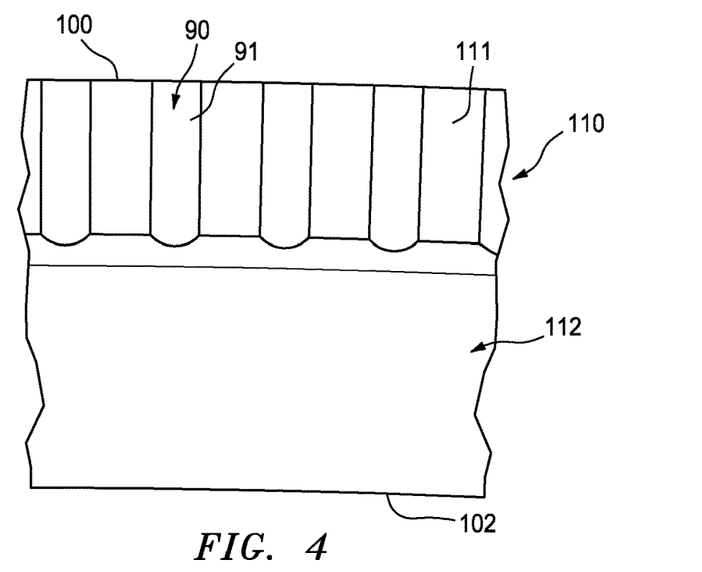
FIG. 4 is a cutaway view of a first type of manifold plate face.

The manifold 34 has an outer diameter (OD) surface from which the tubes protrude. This outer diameter surface is formed by the combined outer diameter (OD) surfaces 100 (FIG. 4) of the plates (inner diameter (ID) surfaces shown as 102). In the example, the end plates 60 and 62 have flat first end faces forming the axial ends 50 and 52 and second (axially inboard/interior) faces including the groove 90 surfaces 91. FIG. 4 shows such a second face of the end plates 60, 62 having the grooves 90 in an outer diameter section 110 (between intact portions 111 of a planar face) and having a relieved inner diameter section 112. The inner diameter section cooperates (with a similar section of the axially outboard face of the mating penultimate plate 64, 66) to form an annular portion of the associated plenum 46A, 46F in combination with an adjacent annular outwardly-open channel in the inlet or outlet manifold body piece 32A, 32B.

The adjacent face of the respective penultimate plate 64, 66 is similarly configured to and represented by the FIG. 4 illustration. The opposite face (axially inboard) of each penultimate plate 64, 66 has a similar outboard portion 114 (FIG. 5) but an intact inboard portion 116 leaving an intermediate portion forming an annular channel 118 radially therebetween for forming one half of the associated transfer plenum 46B, 46C, 46D, 46E. FIG. 6 shows the intact nature of the section 116 having a face 117 coplanar with intact portions of the outboard portion between the grooves 90.

Figure 5:
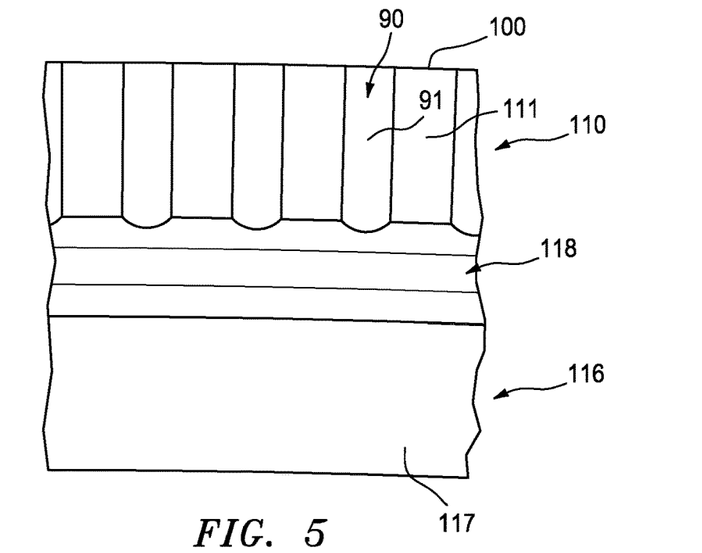
FIG. 5 is a cutaway view of a second form of manifold face.
Figure 6:
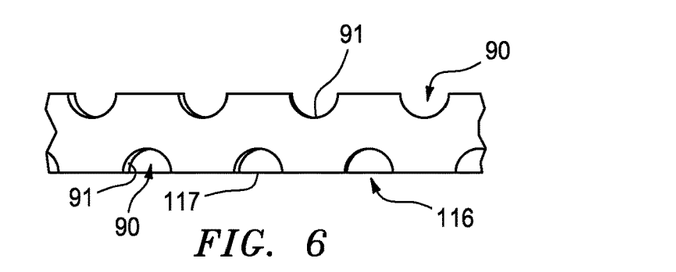
FIG. 6 is a cutaway outer diameter view of a manifold plate.
Figure 7:
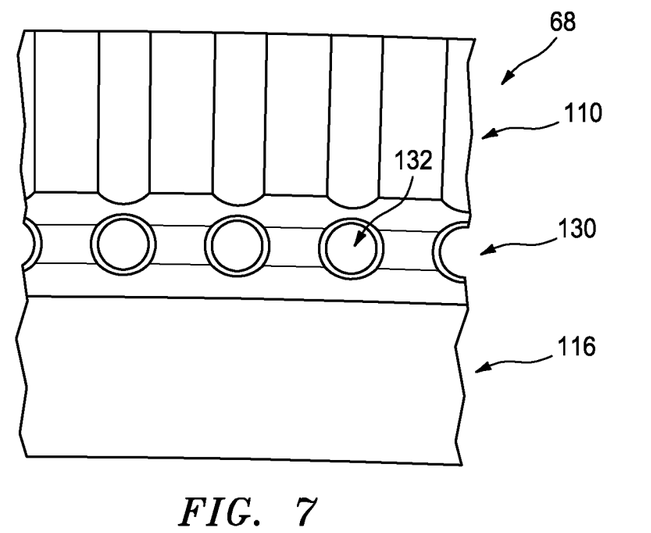
FIG. 7 is a cutaway view of a third type of manifold face.

The first intermediate plates 68 have two faces (FIG. 7) of similar geometry to the penultimate plate 64, 66 inboard faces of FIG. 5 but having an intermediate channel-forming section 130 differing from section 118 by having a plurality of through-holes 132. Through-holes 132 provide transfer from one stage to the next.

The second intermediate plate(s) 70 have both faces similar to the FIG. 5 face and lacking such through-holes 132.

Aerodynamic forces from the second flow 912 as well as other vibrations may cause deleterious resonant behavior in the tubes. Accordingly, it is desirable to support the tubes at one or more radial locations outboard of the manifold 34. FIG. 1A shows an outer diameter support assembly 200 and an intermediate support assembly 202. The number of support assemblies may depend upon numerous factors including the radial span of the tubes.

Each support assembly 200, 202 includes one or more fiber members engaging the tubes. The fiber members help maintain spacings of the tubes, preventing/damping potentially damaging vibrations while accommodating differential expansion of the tubes (e.g., the tubes can radially slide relative to the fiber members). In the illustrated example, each support comprises pairs of fiber members interwoven with the tube legs. Example fiber members are in strip form such as woven straps or tapes. Example fiber material is glass fiber. Alternative forms include woven twisted threads and non-woven batts (batting).

Figure 2B:
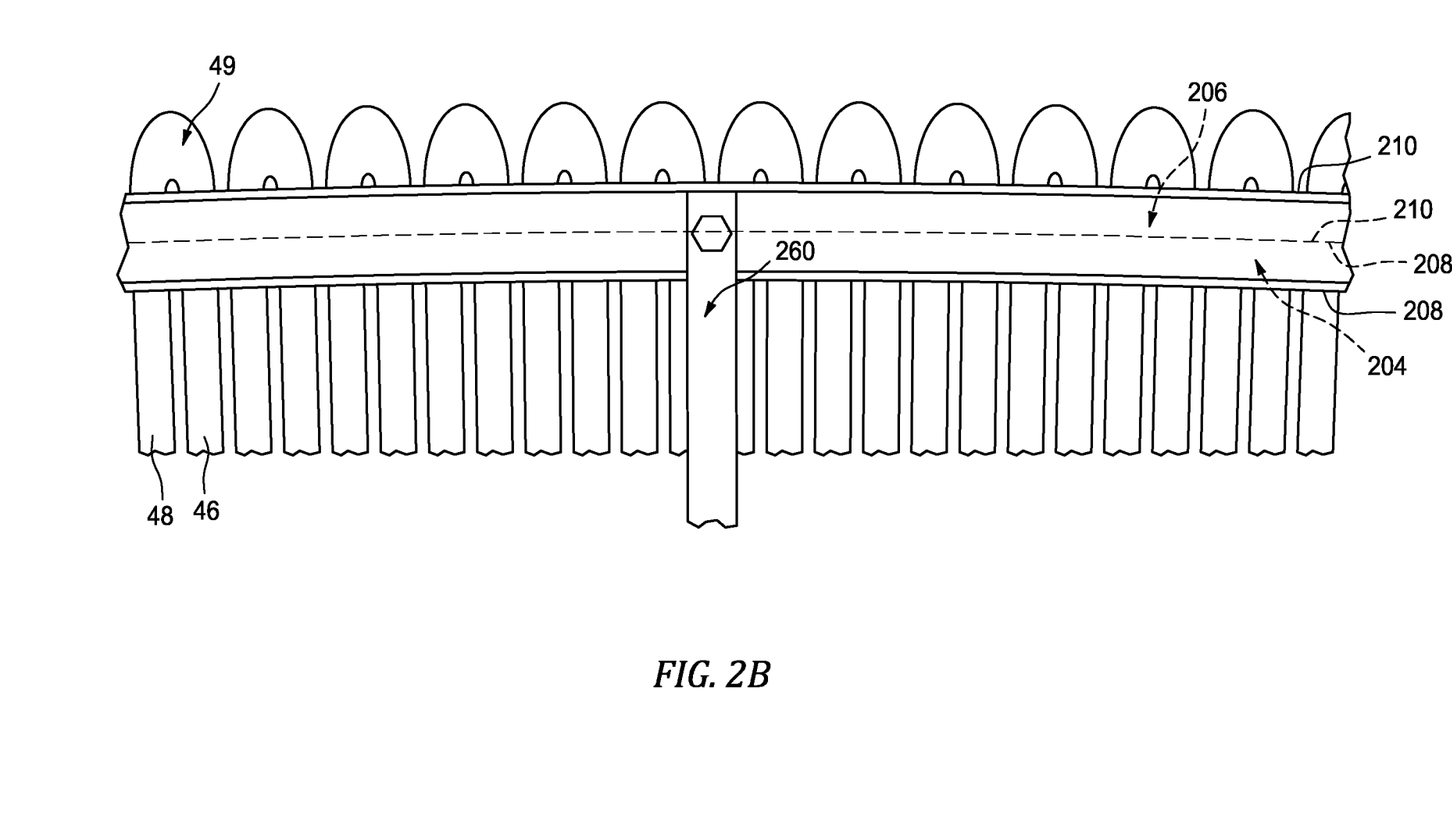
FIG. 2B is an enlarged view of an outer diameter (OD) region of the heat exchanger sector of FIG. 2A.
Figure 3:
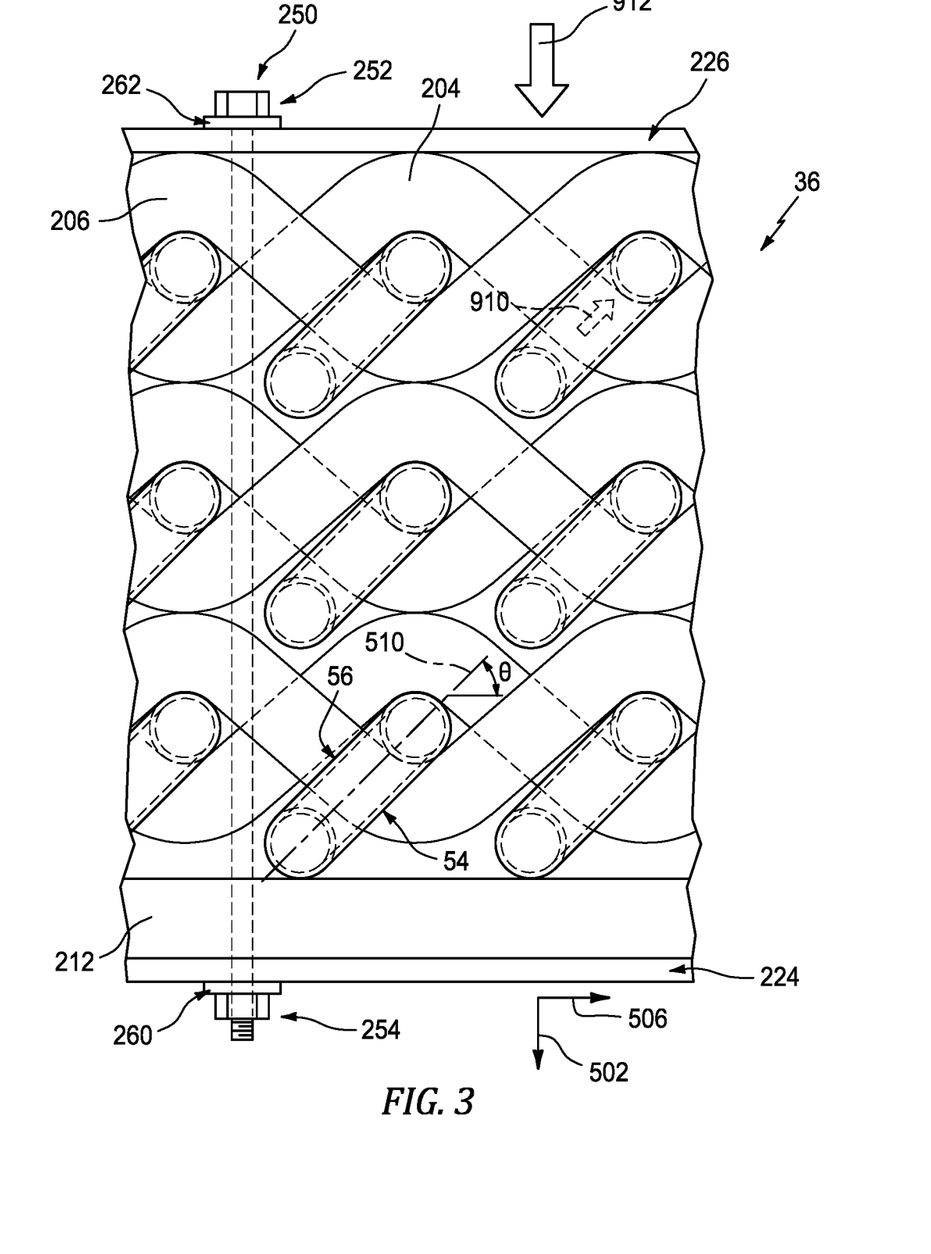
FIG. 3 is a partial outer diameter (OD) view of the heat exchanger.

In this example, the OD support 200 has pairs of fiber straps engaging groups of tube legs out of phase with each other. For example, with the outer support, there are pairs of associated proximal (closer to the manifold) fiber straps 204 (FIG. 3) and distal fiber straps 206. FIG. 2B shows the fiber straps as having proximal edges 208 and distal edges 210 (FIG. 2B). In the example, the proximal fiber strap 204 distal edge abuts the distal fiber strap 206 proximal edge. FIG. 3 also shows a woven fiber strap 212 at one end of the tube array. This may have a height equivalent to the combined heights of the other straps on a given stage.

An example of a woven sheet material that may be cut into strips/straps 204, 206, 212 is "Fiberglass Fabric Gasket Sheet" of USA Sealing, Buffalo, NY.

Thread instead of such straps may be particularly relevant to finer tubes with smaller spacings. An example twisted fiberglass thread is "Chemical-Resistant High-Temperature Thread" of McMaster-Carr, Aurora, OH. Typically sold as PTFE coated. the PTFE may ease interweaving of the thread with the tubes but may be baked off pre-use. If such thread is directly used, is particularly likely that there are many more than two spanwise stacked threads.

Alternative fiber material includes carbon fiber and ceramic fiber. Glass has advantages of durability over ceramic and temperature capability over carbon fiber In the example, the intermediate support 202 (FIG. 2A) has similar proximal straps 230 and distal straps 232.

The OD support further includes metallic end plates 224, 226 and the intermediate support includes similar end plates 244, 246. Each support may be axially held together by fasteners 250 such as bolt 252 and nut 254 combinations extending through axial holes in the stack. The fiber members are shown particularly schematically because actual configurations may have the fiber members locally compressed to conform where contacting, tubes, plates, and other fiber members. Additionally, axial spacers (not shown) such as axial metallic struts may, under compression, bridge the end plates to maintain their axial/longitudinal spacing and prevent overcompression by the fasteners. Or the fasteners themselves may maintain the spacing such as via intermediate nuts. Or struts alone may be fastened to the end plates by fasteners, welding, or the like. Additional overwrapping or other means for further radially containing/constraining the fiber members may be provided.

FIG. 3 further shows radial straps or struts 260, 262 (e.g., metallic) securing supports 224, 226, 244, 246 to each other and to the manifold 34 to maintain spacing. The example radial straps 260, 262 may be secured via the fasteners 250 to the associated supports and may be similarly secured to the manifold or may be brazed, welded, or diffusion bonded to the manifold. In alternative embodiments, the straps only connect the supports to each other and not to the manifold and/or may connect to radially outboard environmental structure (e.g., an outer duct wall).

Depending upon implementation, the fiber straps 204, 206, 212 may be retained against becoming dislodged such as via additional through-fasteners (not shown) similar to the fasteners 250. For example, at a given transverse position (circumferential in the annular embodiment) there may be two radially-spaced through-fasteners associated with the respective two radial positions of fiber straps 204, 206.

In variations, there may different interweavings of the fiber straps relative to the tubes. This may depend upon tube orientation.

In further variations, there simply could be fiber layers extending transversely (circumferentially for the annular heat exchanger) between stages and/or between legs of a given stage. For example, with the FIG. 3 angled configuration, the alternative could include alternating sets of layers between tube stages and layers between the legs of a given tube stage.

Similarly, other variations could involve axial interweaving and/or diagonal interweaving.

Although separate weaves and layers are shown, there may be a continuous weave progressing from one stage to another or otherwise from one group of tubes or tube legs to another. For example, a weave might proceed axially through an axial group of tube legs from one axial end of the heat exchanger to the other then turn and come back along the next axial group, etc.

In use, differential thermal expansion may cause relative sliding of the tubes and fiber members. The particular direction of motion may depend on several factors including the temperatures of the fluid flows. An example temperature domain may involve peak temperature in the range of 500° C. to 600° C. for placement in a combustion gas flow. When used as an intercooler, temperatures may be about 150° C.

Example tube outer diameters are 1.0 mm to 3.0 mm, more broadly 1.0 mm to 10.0 mm. Example tube radial protrusions (radial span between manifold OD and turn OD) are at least 10 cm, more particularly 10 cm to 50 cm.

Component materials and manufacture techniques and assembly techniques may be otherwise conventional. The tubes may be formed by extrusion or sheet metal rolling techniques, cut to length, and bent to shape. The manifold components may be machined from ingot stock or may be forged and machined or may be cast and machined. Fiber straps may be woven via conventional techniques. Metal straps and supports may be cut and bent from sheet or strip stock.

Depending upon implementation, assembly of the fiber members to the tubes may be performed before assembly of the tubes to the manifold or manifold components or after, or during. In an example of pre-assembly, groups of tubes may be held in a fixture and the fiber strap(s) may be pre-formed into a wave and slid past the ends of the tube legs.

Material may be compatible with operational conditions. Example tube, manifold, support 224, 226, and strap 260, 262 material are stainless steels and nickel-based superalloys.

Elements shown as individual pieces may be formed as multiple pieces and then integrated (e.g., via casting annular manifold segments and integrating into a full annulus such as by welding, diffusion bonding, and the like).

The heat exchanger may be assembled in layers starting with a plate at one end of the manifold stack and the associated fiber member(s) at the end(s) of their stack(s). The tubes may be put in place and subsequent layers built up. Depending upon implementation, the tubes may be placed flat atop exposed faces of the plates and fiber member(s) or may need to be inserted radially inward.

On stack completion, the bolts 252 or other fasteners (if present) may be inserted through pre-drilled holes (or the fasteners may have been preinstalled and used to help align subsequent blocks during stacking). Nuts 254 may be attached and tightened.

The plates of the manifold may be secured to each other such as via brazing, diffusion bonding, or welding, or may be secured such as by using fasteners as with the bolts.

In some embodiments/uses, the first flow 910 may be a pumped liquid and may remain a pumped liquid. In alternative embodiments/uses, the first flow may be a gas or may start out as a liquid and may be fully or partially vaporized.

An example specific use situation is in a recuperator or waste heat recovery wherein the first flow 910 is of the recuperator working fluid (e.g., carbon dioxide). The heat exchanger 20 may be used as a heat absorption heat exchanger in the hot section of the engine (e.g., absorbing heat from combustion gases (as the second flow 912) in an exhaust duct downstream of the turbine). Alternatively, the heat exchanger may be used as a heat rejection heat exchanger (e.g., rejecting heat to air (as the second flow 912) in a fan duct or other bypass).

Figure 8:
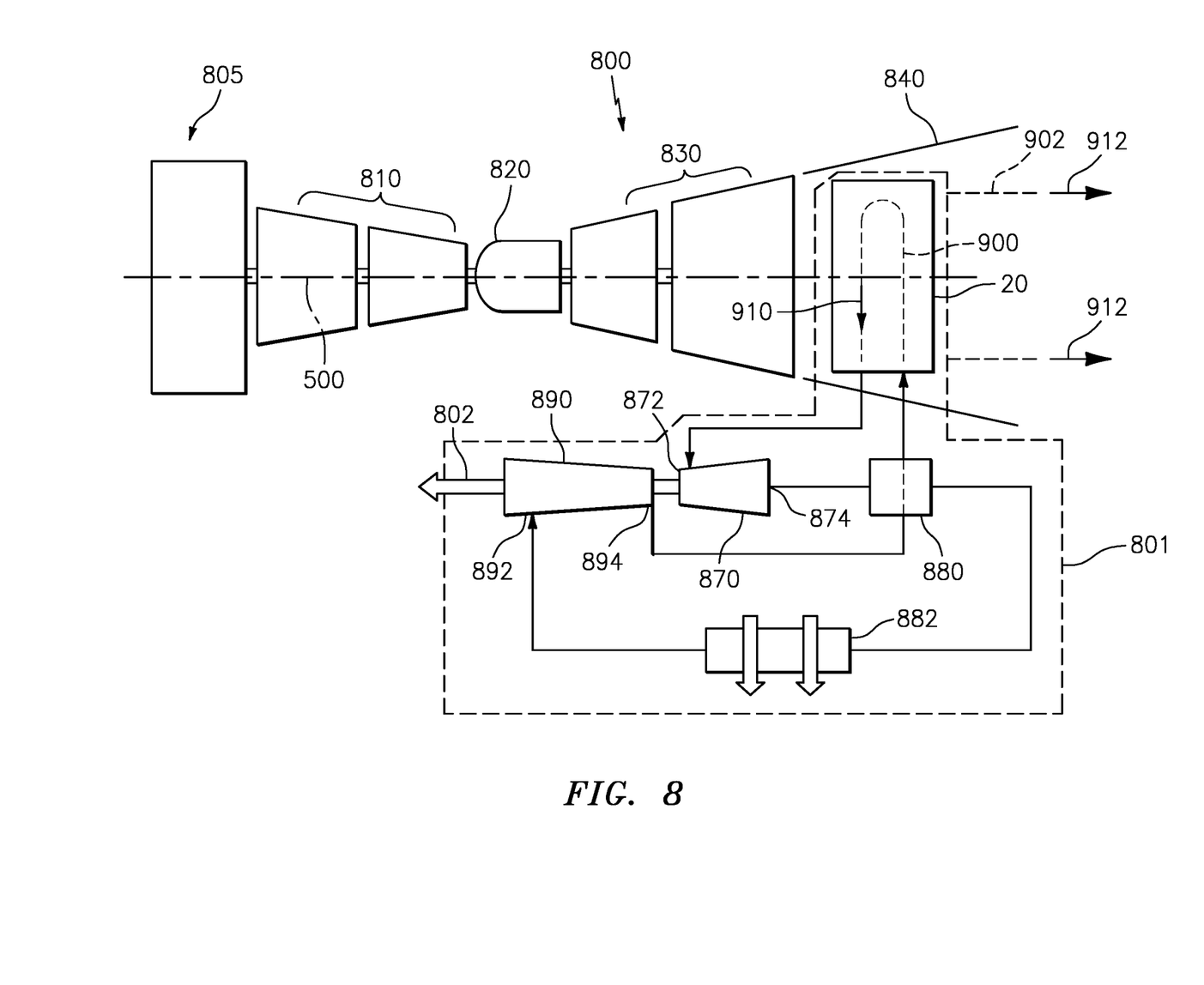
FIG. 8 is a schematic view of a gas turbine engine having the annular heat exchanger in a recuperating supercritical $CO_2$ bottoming cycle.

FIG. 8 schematically illustrates a gas turbine engine 800, including the heat exchanger 20 in a waste heat recovery system (recuperator) 801. The example engine is an aircraft propulsion engine, namely a turbofan. The engine has a fan section 805, one or more compressor sections 810, a combustor section 820 and one or more turbine sections 830, sequentially along a primary fluid flowpath (core flowpath). The fan also drives air along an outboard bypass flowpath.

The example engine is a two-spool engine with the low spool directly or indirectly (e.g., via reduction gearbox) driving the fan. Example combustors are annular combustors and can-type combustor arrays.

A downstream section of the core flowpath provides the second flowpath 902. Downstream of the turbine section 830 is an exhaust casing 840 which exhausts combustion gas (as the fluid flow 912) into an ambient atmosphere downstream of the turbine.

In order to recapture the waste heat from the combustion gas flow 912 and convert the waste heat to work, the heat exchanger 20 is positioned within the exhaust casing 840. The first flowpath 900 is a leg of a supercritical $CO_2$ ($sCO_2$) bottoming Brayton cycle (referred to herein as the waste heat recovery system 801). The heat exchanger 20 is connected to transfer heat from the turbine exhaust to the waste heat recovery system 801, and the waste heat recovery system 801 converts the heat into rotational work (which may be used for various purposes such as driving an electrical generator (not shown) to power aircraft systems). The waste heat recovery system 801 may additionally recuperate waste heat within the recovery system 801 and is referred to as a recuperating bottoming cycle.

The waste heat recovery system 801 has a turbine 870 with an inlet 872 connected to an output of the heat exchanger 20. The turbine 870 expands the heated working fluid ($CO_2$ or other cryogenic fluid 910) and expels the heated working fluid through a turbine outlet 874. The expelled working fluid is passed through a relatively hot passage of a recuperating heat exchanger 880, and is passed to a relatively hot passage of a heat rejection heat exchanger 882. The heat exchanger 882 may be positioned to reject thermal energy from the working fluid to ambient air (e.g., fan bypass air). After passing through the heat rejection heat exchanger 882, the working fluid is passed to an inlet 892 of a compressor 890. The compressor 890 (driven by the turbine 870 (e.g., co-spooled)) compresses the working fluid, and passes the compressed working fluid from a compressor outlet 894 to a cold passage of the recuperating heat exchanger 880.

During operation of the waste heat recovery system 801, the compressor 890 compresses the working fluid, and passes the compressed working fluid through the recuperating heat exchanger 880 and the heat exchanger 20, causing the compressed working fluid to be heated in each of the heat exchangers 20, 880. The heated working fluid is provided to the inlet 872 of the turbine 870 and expanded through the turbine 870, driving the turbine 870 to rotate. The rotation of the turbine 870 drives rotation of the compressor 890 and of an output shaft 802. The output shaft 802 may be mechanically connected to one, or more, additional turbine engine systems and provides work to those systems using any conventional means for transmitting rotational work. Additionally or alternatively, the rotational work can be converted into electricity and used to power one or more engine or aircraft systems using a conventional electrical generator system coupled to the output shaft.

Numerous variations may be implemented. For example, whereas the FIGS. 1-3 heat exchanger is full annulus, the heat exchanger and/or various of its components may be circumferentially segmented. At a minimum, the fiber member(s) may be formed as segments of an annulus with each fiber member(s) stage being assembled as a circumferential array of segments. The segments of each sequential stage may be out of phase with each other to improve structural rigidity. The circumferentially segmented fiber member(s) stage may held mounted in annular form by the front and rear plates and/or by mounting to environmental structure.

Although shown with transversely-extending fiber member(s) (circumferential in the annular example) other fiber member(s) orientations may be provided including axially-extending.

Figure 2:
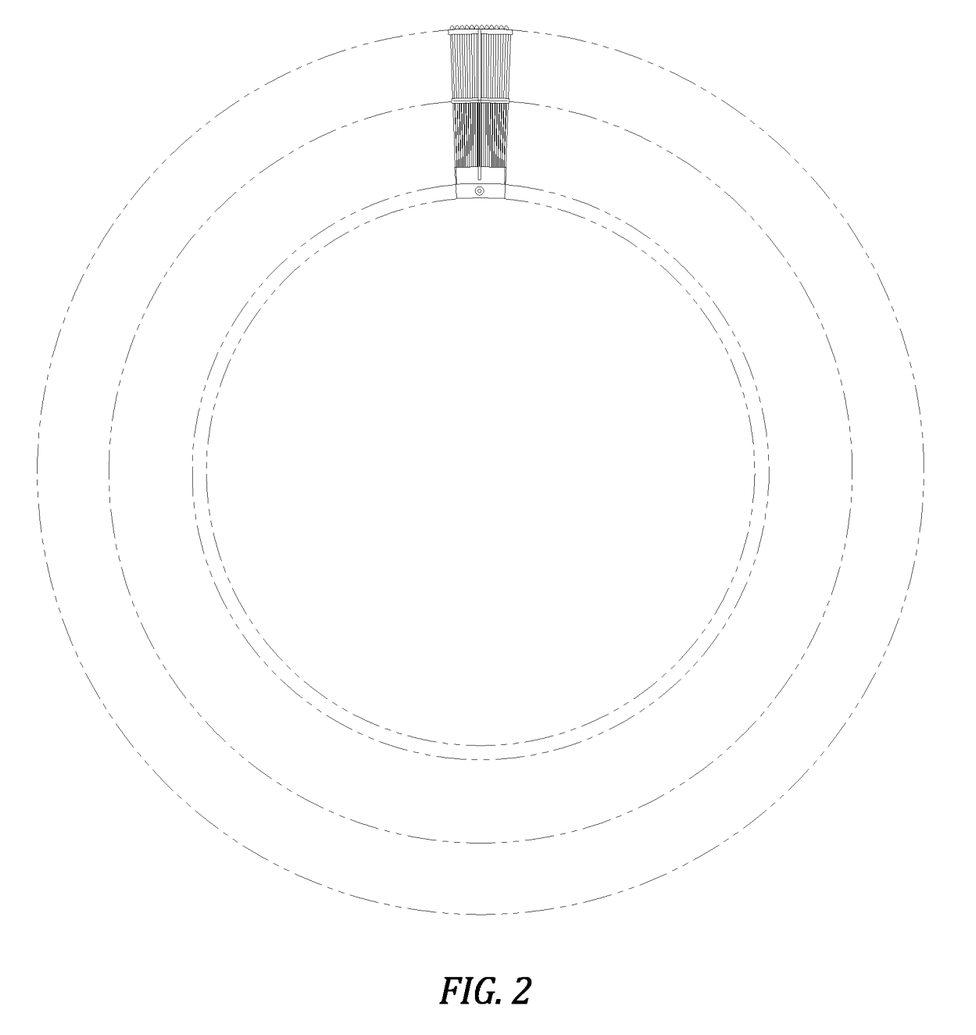
FIG. 2 is a front view of the heat exchanger.
Figure 2A:
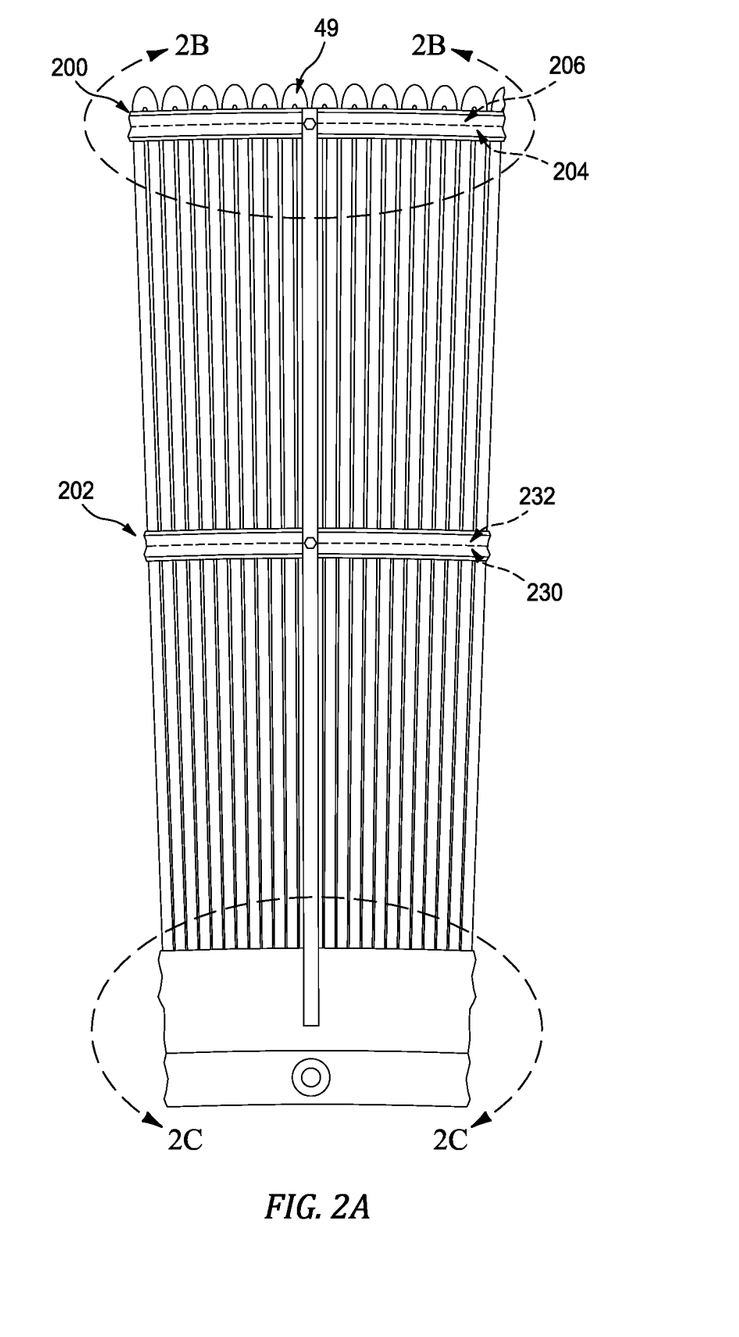
FIG. 2A is an enlarged view of a sector of the heat exchanger.
Figure 2C:
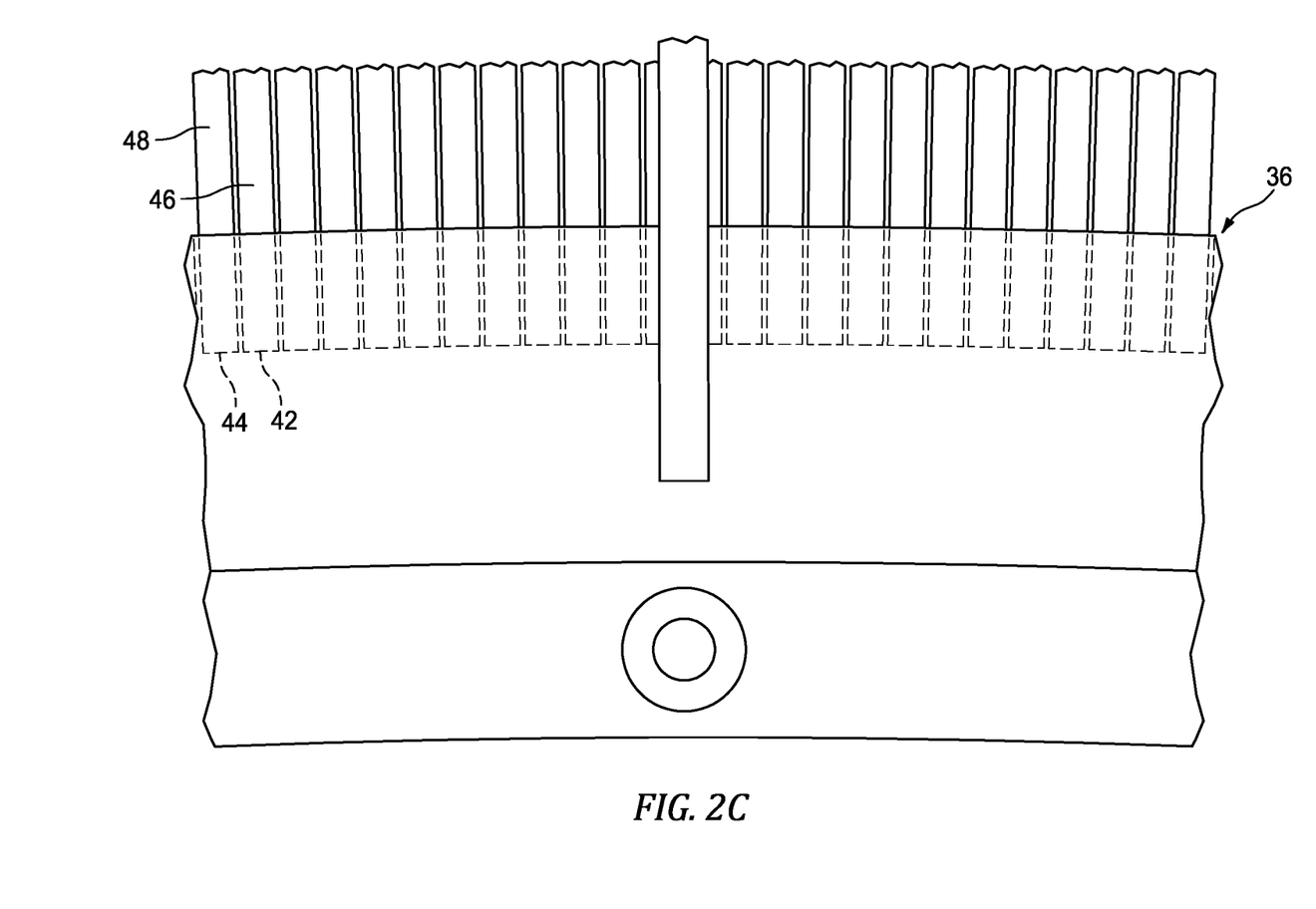
FIG. 2C is an enlarged view of an inner diameter (ID) region of the heat exchanger sector of FIG. 2A.

Although each FIG. 1-3 tube is oriented diagonally (e.g., the legs are axially and circumferentially offset from each other) other configurations may involve tubes wherein the legs are not axially offset from each other or not circumferentially offset from each other. That latter example may be particularly amenable to the aforementioned axially-extending alternative block configurations.

Although the example fiber member(s) capture portions of the legs leaving the turn protruding out from the associated fiber member(s) alternative examples may involve embedding the turn in the associated fiber member(s).

Although discussed in the context of an annular heat exchanger other configurations are possible. For example, in a rectangular duct a bank of tubes may extend parallel from a straight/flat manifold. Depending upon implementations, there may be two opposite banks extending in opposite directions such as from opposite faces of a single central manifold.

Figure 9:
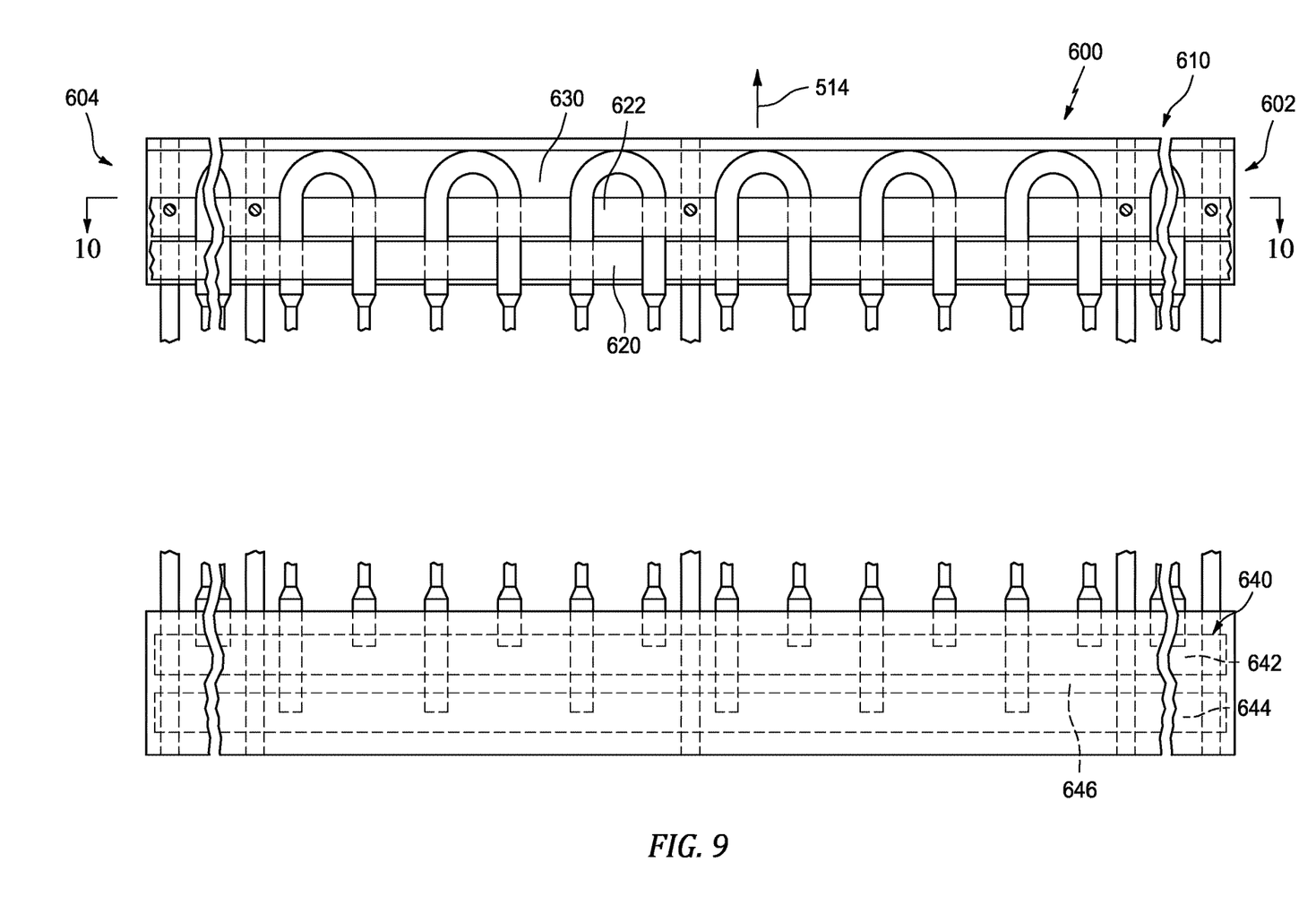
FIG. 9 is a transverse sectional view of an alternate heat exchanger.
Figure 10:
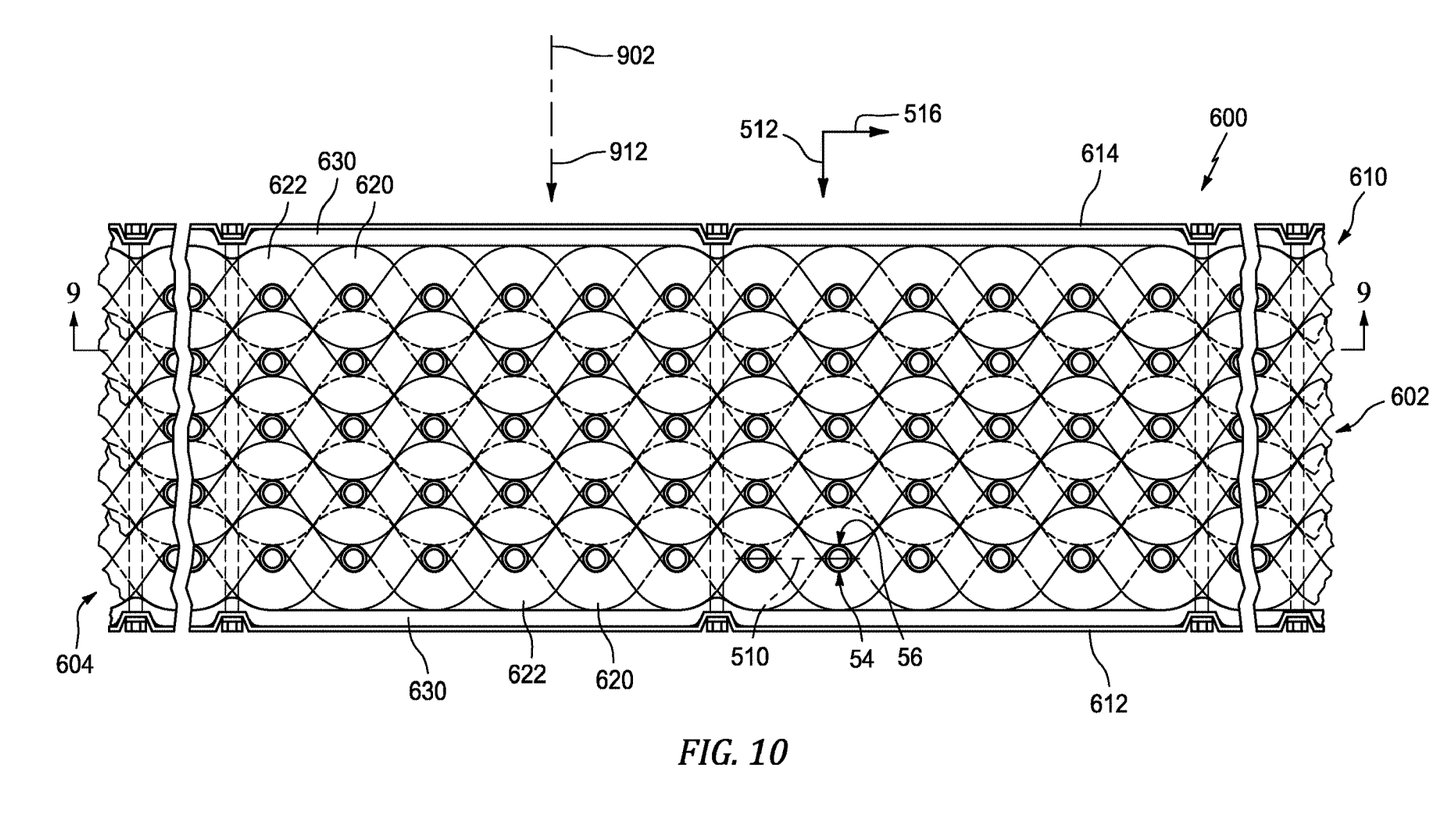
FIG. 10 is a transverse sectional view of the heat exchanger of FIG. 9.

As an example of several such variations, FIGS. 9 and 10 show a heat exchanger 600 that is not full annulus but, extends between ends 602, 604 transverse to the flowpath 902. Additionally, rather than being an arcuate segment (e.g., in a situation where multiple segments are assembled end-to-end to form an annulus) the heat exchanger is straight (e.g., rectangular in footprint looking up or down the flowpath 902). Additionally, the legs of a given tube are oriented similarly transverse to the second flowpath 902 rather than at an angle ($\theta$ is 0° vs the ~45° of FIG. 3). FIGS. 9 and 10 show a downstream direction 512 of the flowpath 902, a direction 514 outward from the manifold, and a transverse direction 516 normal thereto.

The tube support 610 (FIG. 9) comprises fiber members passing between legs of the tube sections. For each stage of tubes, the fiber members include a proximal fiber member 620 (closer to the manifold 640) and a distal fiber member 622. In the example, for each stage of tubes, the fiber members 620 and 622 are exactly out-of-phase with each other. Thus, when one fiber member 620, 622 passes in front of a tube leg, the other passes behind that tube leg. From stage-to-stage, the fiber members 620 and 622 may be in-phase with the corresponding members of the adjacent stages. FIG. 10 shows how this results in nesting of the fiber members of adjacent rows. To better illustrate the interweaving of the members and tube legs, FIG. 9 thus is not a true sectional view where the fiber members of one or two adjacent stages would be cut. Rather it's a cutaway by entirely removing the fiber members of the tube stages that are above the view lane.

Example fiber members 620, 622 are woven fiber straps. Alternative fiber members may be as discussed above.

Optionally, at ends of the stack, fiber members such as straps or batts (batting) 630 (FIG. 10) may intervene between the end plate(s) 612, 614 the adjacent members 620, 622. The end plates may sandwich the tubes and fiber members and be secured via fasteners as discussed above.

In the example, the manifold 640 (FIG. 9) has, at each fore-to-aft stage location, a pair of plenums 642, 644 separated from each other by a wall 646. Tube end portions may be of different lengths so that one end portion of each tube is in communication with the first plenum 642 and another in communication with the second plenum 644.

As a further variation, intermediate portions of the tube legs are shown flattened transversely to the flowpath 902 to improve rigidity and aerodynamic stability and increase thermal exposure while limiting restriction of the flow 912. A flattening elongates such intermediate sections of the tubes in the direction of the flowpath 902.

If an intermediate support is present, an adjacent portion of the tube may be undeformed and of circular cross-section. Or, a different weave may be used to accommodate.

FIGS. 9 and 10 show supports, straps, and fasteners similar to those in FIGS. 1-3. Not shown are the overall inlet and outlet ports and plenum-to-plenum transfer apertures similar to those of the FIGS. 1-3 embodiment.

Also, regarding use variations, some variations may have a fuel as the first fluid flow 910. Although the heat exchanger may transfer heat to a conventional liquid fuel (e.g., kerosene-type jet fuels (such as Jet A, Jet A-1, JP-5, and JP-8), the heat exchanger may be used for future fuels such as liquid hydrogen, potentially vaporizing that fuel.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for heat exchange between a first fluid and a second fluid and comprising:
   a plurality of tube sections, each comprising:
      an interior for passing the first fluid;
      an exterior for exposure to the second fluid;
      a first leg;
      a second leg; and
      a turn joining the first leg to the second leg;
   a manifold, wherein the first leg and second leg of each of the tube sections are mounted to the manifold and in communication therewith; and
   a support comprising:
      fiber members interwoven with legs of the tube sections;
      a first end plate; and
      a second end plate sandwiching the fiber members and plurality of tube sections between the first end plate and the second end plate.

2. The heat exchanger of claim 1 wherein the fiber members comprise:
   glass fibers.

3. The heat exchanger of claim 1 wherein the fiber members comprise:
   woven fiber tape.

4. The heat exchanger of claim 1 wherein for each stage of a plurality of stages of the tube sections, the fiber members comprise:
   a first fiber member between alternate legs of the tube sections; and
   a second fiber member between alternate legs of the tube sections and out of phase with the first fiber member.

5. The heat exchanger of claim 4 wherein the first fiber member and second fiber member comprise:
   woven fiber tape.

6. The heat exchanger of claim 1 wherein the support further comprises:
   a further fiber member between the fiber members and the end plate.

7. The heat exchanger of claim 1 wherein the support further comprises:
   fasteners axially holding the support together.

8. The heat exchanger of claim 1 wherein the support is a first support and the heat exchanger comprises a second support spaced from the first support and comprising:
   fiber members passing between legs of the tube sections; and
   an end plate.

9. The heat exchanger of claim 8 further comprising means for maintaining a spacing between the first support and the second support.

10. The heat exchanger of claim 1 wherein the end plate of the support comprises a metallic body.

11. The heat exchanger of claim 1 wherein:
    the plurality of tube sections have flattened intermediate portions along their first legs and second legs.

12. The heat exchanger of claim 1 wherein:
    the heat exchanger is an annular heat exchanger.

13. The heat exchanger of claim 1 wherein:
    the manifold comprises a plate stack.

14. The heat exchanger of claim 1 wherein:
    the plurality of tube sections are positioned in a plurality of stages from upstream to downstream along a flowpath of the second fluid.

15. The heat exchanger of claim 1 wherein:
    the manifold has a convex outer surface from which the plurality of tube sections extend and the support is spaced from the manifold.

16. The heat exchanger of claim 1 wherein:
    the plurality of tube sections are positioned in a plurality of stages from upstream to downstream along a flowpath of the second fluid.

17. A turbine engine including the heat exchanger of claim 1 and further comprising:
    a gas path passing gas across exteriors of the plurality of tube sections.

18. The turbine engine of claim 17 further comprising:
    a recuperator including the heat exchanger.

19. A method for using the heat exchanger of claim 1, the method comprising:
    passing a first fluid flow through interiors of the tube sections; and
    passing a second fluid flow along a second flowpath across exteriors of the tube sections, wherein:
    the passing of the first flow and the second flow thermally expands the length of the tube sections to cause a sliding interaction between the tube sections and the fiber members.

20. The method of claim 19 wherein:
    the passing the second flow is passing of combustion gases in a gas turbine engine.

* * * * *